(12) United States Patent
Song et al.

(10) Patent No.: US 8,085,895 B2
(45) Date of Patent: Dec. 27, 2011

(54) SPACER GRID SPRING FOR INCREASING THE CONFORMAL CONTACT AREA WITH FUEL ROD

(75) Inventors: Kee-Nam Song, Daejeon-si (KR);
Kyung-Ho Yoon, Daejeon-si (KR);
Kun-Woo Song, Daejeon-si (KR);
Kang-Hee Lee, Daejeon-si (KR);
Kyung-Jin Park, Ansan-Si (KR)

(73) Assignees: Korea Atomic Energy Research Institute, Daejoen (KR); Korea Hydro & Nuclear Power Co., Ltd., Seoul (KR)

(*) Notice: Subject to any disclaimer, the term of this patent is extended or adjusted under 35 U.S.C. 154(b) by 105 days.

(21) Appl. No.: 11/707,450

(22) Filed: Feb. 16, 2007

(65) Prior Publication Data

US 2007/0242793 A1      Oct. 18, 2007

(30) Foreign Application Priority Data

Apr. 13, 2006     (KR) .................. 10-2006-0033570

(51) Int. Cl.
*G21C 3/34* (2006.01)
(52) U.S. Cl. ...................... 376/462; 376/438
(58) Field of Classification Search .......... 376/438, 376/462
See application file for complete search history.

(56) References Cited

U.S. PATENT DOCUMENTS

| | | | | |
|---|---|---|---|---|
| 4,389,369 A | * | 6/1983 | Bryan | 376/442 |
| 4,659,542 A | * | 4/1987 | Kerrey | 376/442 |
| 6,707,872 B2 | * | 3/2004 | Yoon et al. | 376/442 |

OTHER PUBLICATIONS

Ki-jong Park et al.: "Design of a Spacer Grid Using Axiomatic Design" Journal of Nuclear Science and Technology, vol. 40, No. 12, p. 19.
Kee-nam Song et al.: "Shape optimization of Spacer Grid Springs to Support Nuclear Fuel Rods", 11th International Conference on Nuclear Engineering Tokyo, Japan, Apr. 20-23, 2003 ICONE11-36500.
Ki-Jong Park et al.: "Structural Optimization for Non-Linear Behavior Using Equivalent Static Loads by Proportional Transformation of Loads", Journal of Mechanical Science and Technology, vol. A 30. No. 1 pp. 66-75, 2006.

* cited by examiner

*Primary Examiner* — Rick Palabrica
*Assistant Examiner* — Erin M Leach
(74) *Attorney, Agent, or Firm* — Bachman & LaPointe, P.C.

(57) ABSTRACT

A grid strap includes a spacer grid spring that increases the conformal contact area with a fuel rod of a nuclear fuel rod assembly. The shape of the spacer grid spring is optimized, thereby increasing the elasticity of the spacer grid spring contacting the fuel rod, expanding the conformal contact area with a contact portion between the spacer grid spring and fuel rod to obtain uniform stress distribution, and reducing excessive plastic deformation of the spacer grid spring. Further, magnitude and distribution of contact pressure between the fuel rod and the spacer grid spring are improved, thereby reducing the possibility of fretting wear caused by contact between the fuel rod and the spacer grid spring. Lastly, the elastic behavior region of the spacer grid spring is expanded, so that the fuel rod can be reliably supported until the fuel rod expires despite changes in the supporting conditions of the fuel rod.

3 Claims, 15 Drawing Sheets

SPACER GRID SPRING FOR INCREASING THE CONFORMAL CONTACT AREA WITH FUEL ROD

BACKGROUND OF THE INVENTION

1. Field of the Invention

The present invention relates to spacer grid spring that increases the conformal contact area with a fuel rod and, more particularly, to spacer grid spring that increases the conformal contact area with a fuel rod, in which the spacer grid spring of the grid strap, which is in contact with the fuel rod, is optimized in shape, thereby the elasticity of the spacer grid spring contacting the fuel rod is increased, the conformal contact area with a contact portion of the spacer grid spring contacting the fuel rod when the fuel rod is inserted into each cell of a spacer grid spring is expanded to realize uniform stress distribution, and excessive plastic deformation of the spacer grid spring can be reduced, and in which magnitude and distribution of contact pressure between the fuel rod and the spacer grid spring are improved, thereby reducing the possibility of fretting wear caused by contact between the fuel rod and the spacer grid spring.

2. Description of the Related Art

In general, spacer grids is one of the components constituting a nuclear fuel assembly in a nuclear reactor, and functions to arrange and support nuclear fuel rods, which constitute unit grid cells thereof, at designated positions by mutually connecting a plurality of straps, each of which has a spacer grid spring and dimples.

FIG. 1 is a perspective view schematically illustrating a conventional nuclear fuel assembly. FIG. 2 is a plan view schematically illustrating spacer grids applied to a conventional nuclear fuel assembly. FIG. 3 is a perspective view schematically illustrating spacer grids applied to a conventional nuclear fuel assembly. FIG. 4 is a perspective view schematically illustrating spacer grid spring for spacer grids applied to a conventional nuclear fuel assembly. FIG. 5 schematically illustrates deformation of spacer grid spring, which is applied to spacer grids of a conventional nuclear fuel assembly, caused by one nuclear fuel rod.

As illustrated in the figures, the conventional nuclear fuel assembly 2 to which spacer grids 110 are applied has a plurality of guide tubes 113 fitted between a top end piece 111 and a bottom end piece 112.

Here, the spacer grids 110 supporting nuclear fuel rods 125 form the nuclear fuel assembly 2 by means of welding with the guide tubes 113 in the longitudinal direction of the guide tubes 113 at regular intervals.

Meanwhile, the spacer grids 110 is usually formed of zircaloy, and includes nuclear fuel rod cells 123 that support the nuclear fuel rods 125, and guide tube cells 124 into which the guide tubes 113 are inserted, wherein each nuclear fuel rod cell 123 is designed such that two spacer grid springs 118 and the total of four dimples 119, which are each located on a top side and a bottom side of each spacer grid spring 118, contact and support each nuclear fuel rod 125 at six supporting points.

Thus, when the spacer grid springs 118 are in contact with the nuclear fuel rods 125 and are deformed by the nuclear fuel rods 125, two supports 121 of each spacer grid spring 118 are pressed by each nuclear fuel rod 125. Here, because the rigidity of each support 121 is similar to that of a central curvature 122, which is connected with the two supports 121 and is contact with each nuclear fuel rod 125, each support 121 is simultaneously subjected to bending 131 and twisting 132 due to a load 130 applied by each nuclear fuel rod 125, as illustrated by arrows in FIG. 5.

When these bending and twisting deformations act on each support at the same time, each nuclear fuel rod 125 is unstably supported, and thus slight sliding occurs between the nuclear fuel rod 125 and the central curvature 122 contacting the nuclear fuel rod 125. As a result, desired conformal surface contact does not occur, thus causing stress concentration. This stress concentration makes the spacer grid spring vulnerable to fatigue, so that each nuclear fuel rod 125 has a high possibility of increasing the fretting wear thereof.

Further, the deformation of the central curvature 122 provides a high possibility of losing the original surface contact profile, and thus exerts an influence on stress distribution and magnitude of peak stress.

Meanwhile, the spacer grid spring 118 and the dimples 119 of each grid strap 115 have the same radius of curvature as the nuclear fuel rods 125, and thus are in conformal surface contact with the nuclear fuel rods 125 from the beginning. Thereafter, when the spacer grid spring 118 receives the load of each nuclear fuel rod 125, the central curvature 122 contacting respective nuclear fuel rod 125, and its support 121 are deformed at the same time.

Further, when spring force of the spacer grid spring 118 and dimples 119 of each grid strap 115 is too weak, the nuclear fuel rods 125 cannot be arranged at designated positions, and thereby have a possibility of losing sound supporting performance. When the spring force is too high, each nuclear fuel rod 125 undergoes defects such as scratching on the surface thereof due to excessive frictional resistance when inserted into the spacer grid 110. Further, during operation of the nuclear reactor, the nuclear fuel rods 125 experience longitudinal growth by means of irradiation of neutrons. This longitudinal growth is not properly accepted, and thus the nuclear fuel rods 125 are bent.

In this manner, when the nuclear fuel rods are bent, the neighboring nuclear fuel rods become too near each other or contact each other. Thus, the coolant channel between the neighboring nuclear fuel rods becomes narrow or is blocked. As a result, heat generated from the nuclear fuel rods is not effectively transmitted to the coolant, thereby increasing the temperature of the nuclear fuel rods. As such, the possibility of generating departure from nucleate boiling (DNB) is increased, which is mainly responsible for the reduction of nuclear fuel output.

In order to solve the above-described problems, recent nuclear fuel development has focused on high combustion and zero defects. In particular, to develop high-combustion nuclear fuel, the thermal performance of the nuclear fuel for promoting heat transmission from the nuclear fuel rods to the coolant must be increased. To this end, a method of improving the flow of the coolant flowing around the nuclear fuel rods is required.

Here, as the method of improving the flow of the coolant flowing around the nuclear fuel rods, a method of changing the geometry of the spacer grid is employed, and may include the attachment of a hybrid vane or a change in its design, or effective construction of a fluid channel.

However, most concepts for raising this thermal performance are based on the principle that the flow of the coolant flowing around the nuclear fuel rods is very turbulent, the flow has a high Reynolds number. In this manner, the turbulence of the coolant flow around the nuclear fuel rods is mainly responsible for, flow induced vibration of the nuclear fuel rods.

The flow induced vibration of the nuclear fuel rods is a factor generating mutual relative motion, in which the nuclear fuel rods slide on the contact surfaces with the spacer grid springs or the dimples of the grid straps. For this reason, the contact surfaces of the nuclear fuel rods are subjected to local wear, which incurs "fretting damage to the nuclear fuel rods", in which the nuclear fuel rods are gradually damaged.

In other words, the contact surfaces between the nuclear fuel rods and the spacer grid springs or dimples of the grid straps are worn, so that the nuclear fuel rods are locally damaged. When this damage becomes serious, the nuclear fuel rods can be broken.

Therefore, the method of raising the thermal performance of the nuclear fuel in order to develop high-combustion nuclear fuel leads instead in damage to the nuclear fuel rods.

As described above, the spacer grids serving to support the nuclear fuel rods must be able to maintain reliable supporting performance during the lifetime of the nuclear fuel rods, and to inhibit the possibility of fretting wear of the nuclear fuel rods.

In this manner, in order to allow the nuclear fuel rods to maintain reliable supporting performance for the lifetime of the nuclear fuel rods, the spacer grid springs must be able to support the nuclear fuel rods with sufficient spring force for the lifetime of the nuclear fuel rods, and to maintain at least enough spring force to support the nuclear fuel rods, which can be variously changed in the nuclear reactor up to the lifetime of the nuclear fuel rods, by expanding the elastic behavior region of the spacer grid springs.

However, during the operation of the nuclear reactor, the spacer grid springs and dimples gradually lose the initial spring force applied to the nuclear fuel rods due to the irradiation of the neutrons. As a result, a gap can develop between the nuclear fuel rods and their supports, and reliable supporting performance of the nuclear fuel rods can be lost by means of the load acting on the nuclear fuel rods in an arbitrary direction due to the flow of the coolant.

Further, in order to inhibit the possibility of the fretting wear of the nuclear fuel rods, the causes of fretting wear must be reduced. These causes generate the gap between the nuclear fuel rods and the supports of the spacer grids due to reduction of the spring force caused by the neutron irradiation, thermal expansion difference between the nuclear fuel rods and the spacer grids, diametrical reduction of the nuclear fuel rods caused by the elongation of the nuclear fuel rods, and so on. The nuclear fuel rods are vibrated by the turbulent flow caused by the coolant flow, and thus fretting wear is accelerated.

SUMMARY OF THE INVENTION

Accordingly, the present invention has been made keeping in mind the above problems occurring in the prior art, and an object of the present invention is to provide spacer grid spring that increases the conformal contact area with a fuel rod, in which the spacer grid spring of the grid strap, which is in contact with the fuel rod, is optimized in shape, thereby the elasticity of the spacer grid spring contacting the fuel rod is increased, the conformal contact area with a contact portion of the spacer grid spring contacting the fuel rod when the fuel rod is inserted into each cell of a spacer grid spring is expanded to obtain uniform stress distribution, and excessive plastic deformation of the spacer grid spring can be reduced, in which the magnitude and distribution of contact pressure between the fuel rod and the spacer grid spring are improved, thereby reducing the possibility of fretting wear caused by contact between the fuel rod and the spacer grid spring, and in which a elastic behavior region of the spacer grid spring is expanded, so that the fuel rod can be stably supported until the lifetime of the fuel rod expires despite changes in the supporting conditions of the fuel rod.

In order to achieve the above object, according to the present invention, there is provided grid strap for spacer grids including upper and lower plates having dimples protruding on one side respectively, and a spacer grid spring which connects the upper and lower plates and is in direct contact with a fuel rod, wherein the spacer grid spring includes upper and lower bases that vertically extend from the middle of the lower end of the upper plate and the middle of the upper end of the lower plate respectively, upper left-hand and right-hand supports and lower left-hand and right-hand supports that branch off from the upper and lower bases, respectively, and are symmetrical with each other, bridges that are connected between the upper and lower left-hand supports and between the upper and lower right-hand supports, and a conformal curvature that is connected between the bridges, protrudes in a direction opposite the dimples, is in direct contact with the fuel rod, and is curved inwards to allow upper and lower ends thereof to have a semi-circular form.

Preferably, each of the bridges located on opposite sides of the conformal curvature may be curved outwards in a semi-circular form, and may have a wedge shape formed on one end thereof.

Here, the spacer grid spring may include connecting pieces that connect the upper and lower plates at proper positions spaced apart from left-hand and right-hand supports in outward directions by a predetermined distance.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
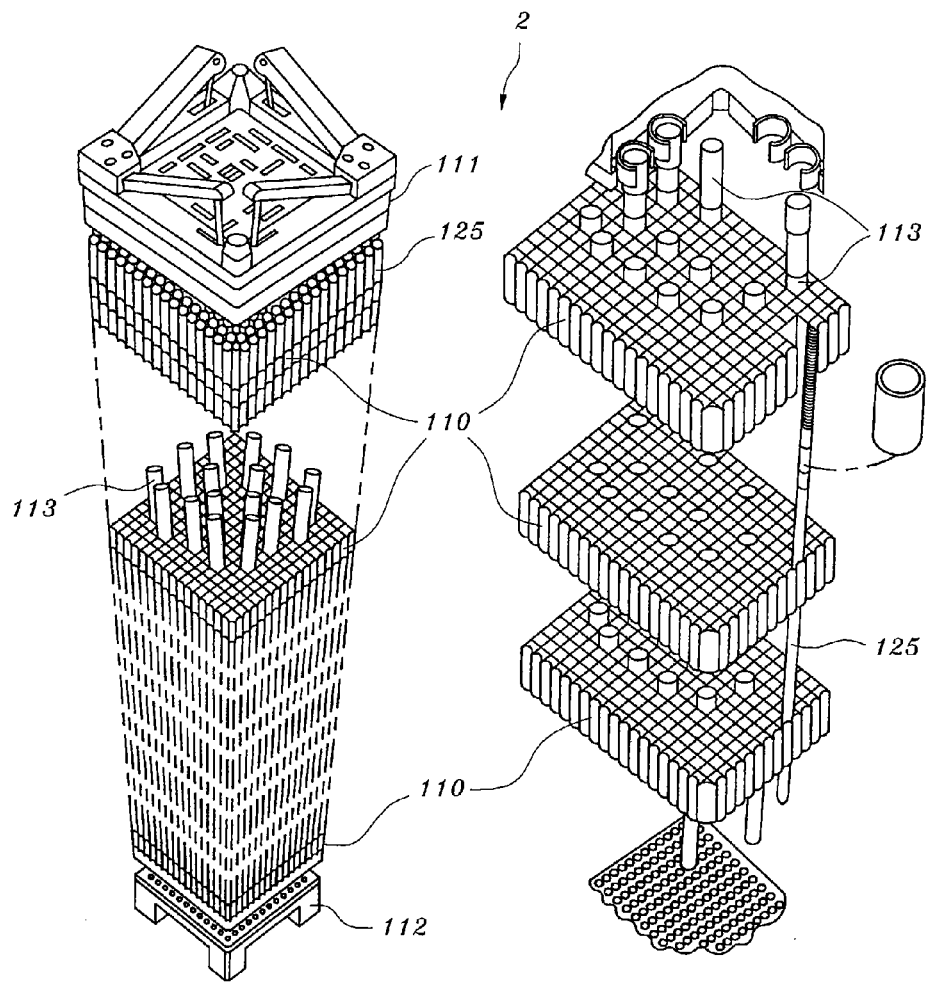
FIG. 1 is a perspective view schematically illustrating a conventional nuclear fuel assembly.
Figure 2:
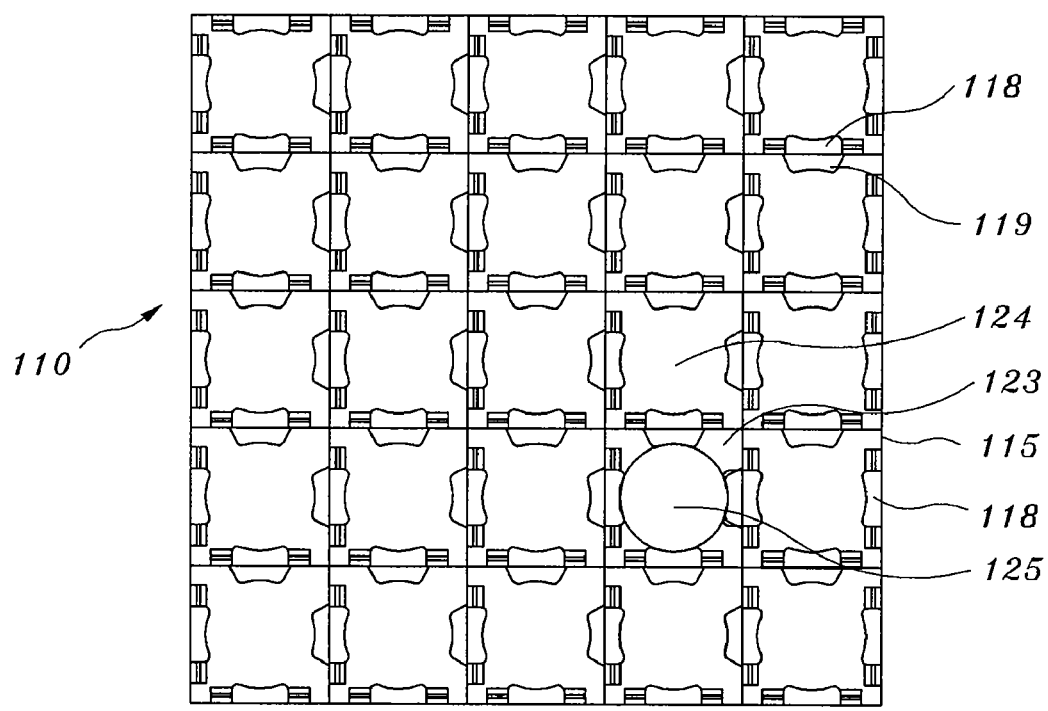
FIG. 2 is a plan view schematically illustrating spacer grids applied to a conventional nuclear fuel assembly.
Figure 3:
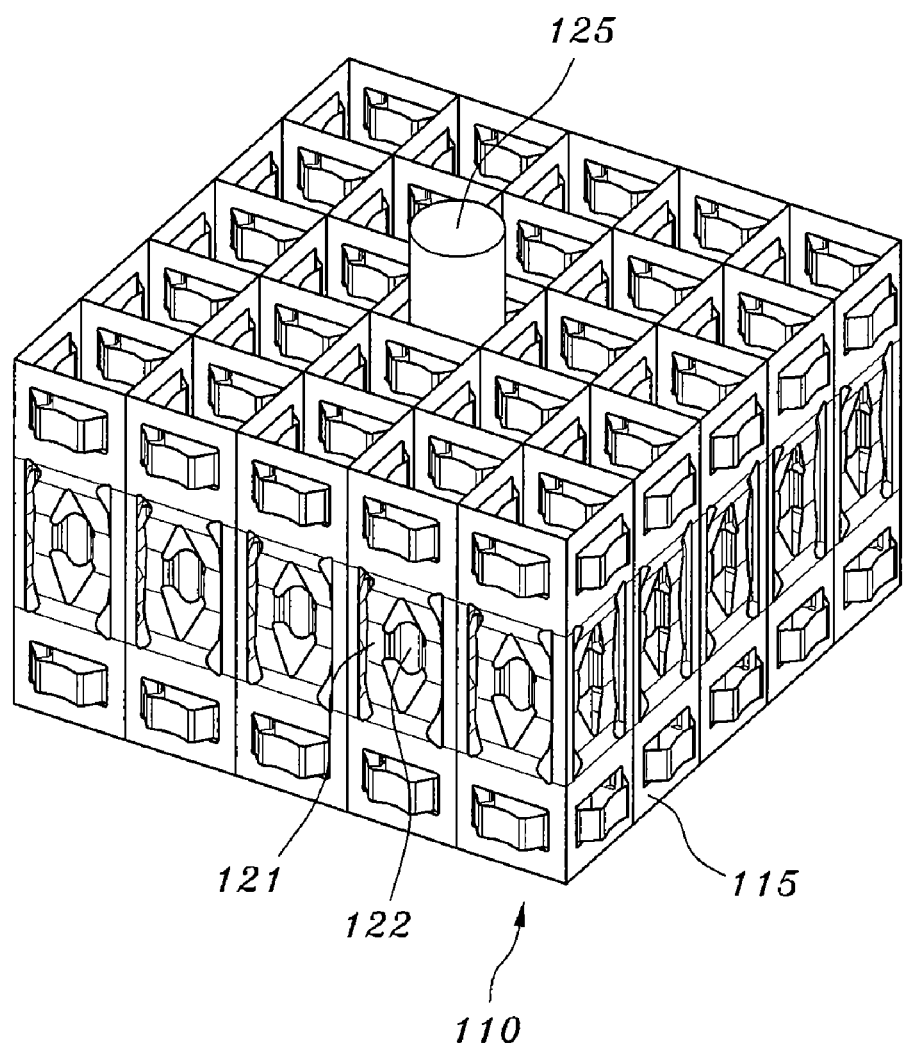
FIG. 3 is a perspective view schematically illustrating one spacer grids applied to a conventional nuclear fuel assembly.
Figure 4:
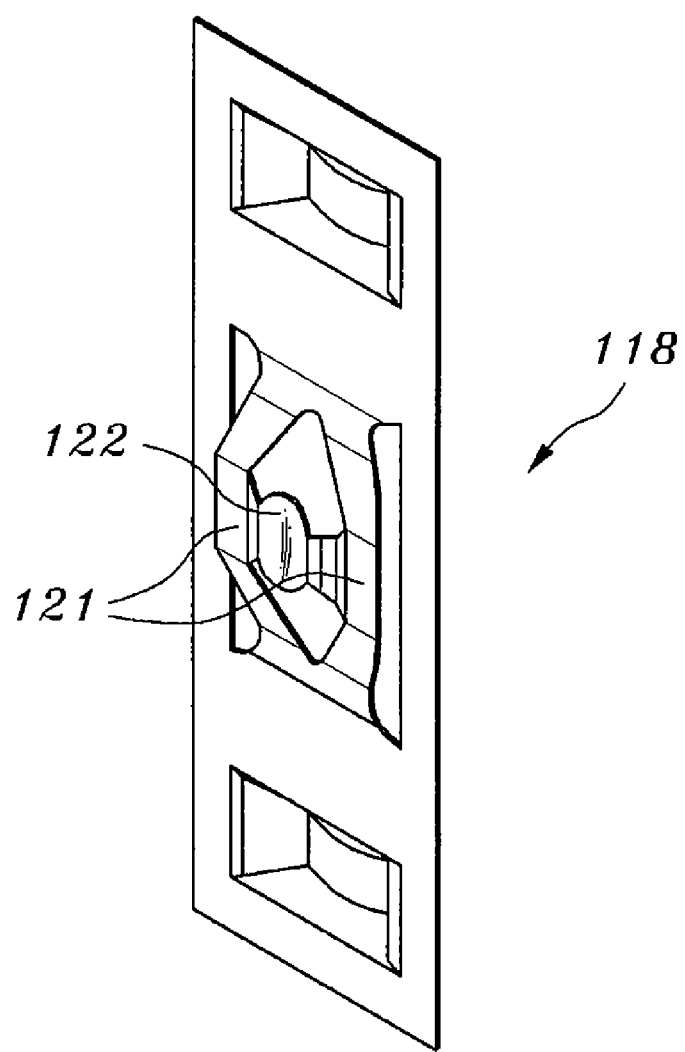
FIG. 4 is a perspective view schematically illustrating spacer grid spring for spacer grids applied to a conventional nuclear fuel assembly.
Figure 5:
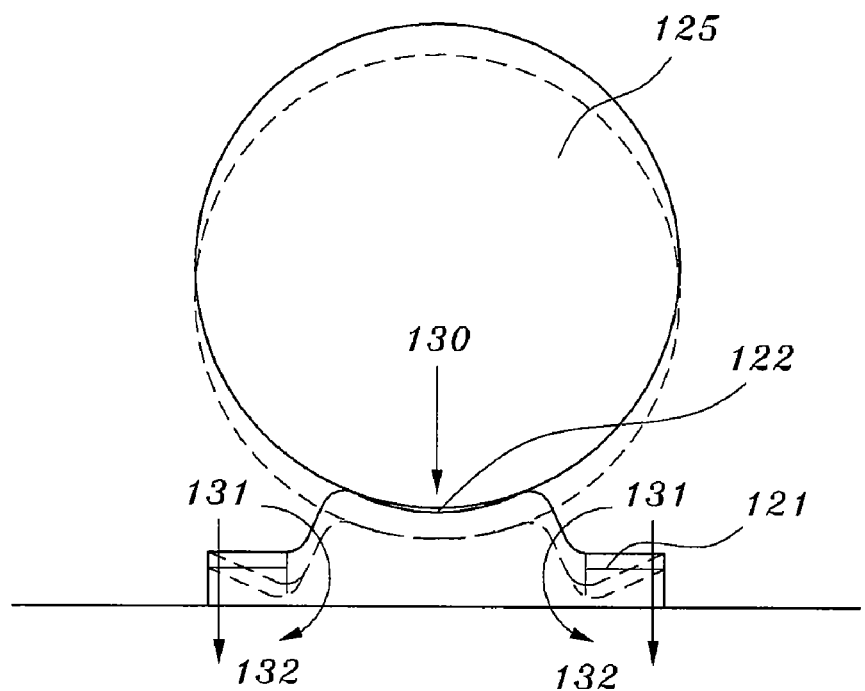
FIG. 5 schematically illustrates the deformation of spacer grid spring, which is applied to spacer grids of a conventional nuclear fuel assembly, caused by one nuclear fuel rod.

Reference will now be made in greater detail to an exemplary embodiment of the invention, which is illustrated in the accompanying drawings. Wherever possible, the same reference numerals will be used throughout the drawings and the description to refer to the same or like parts.

Figure 6:
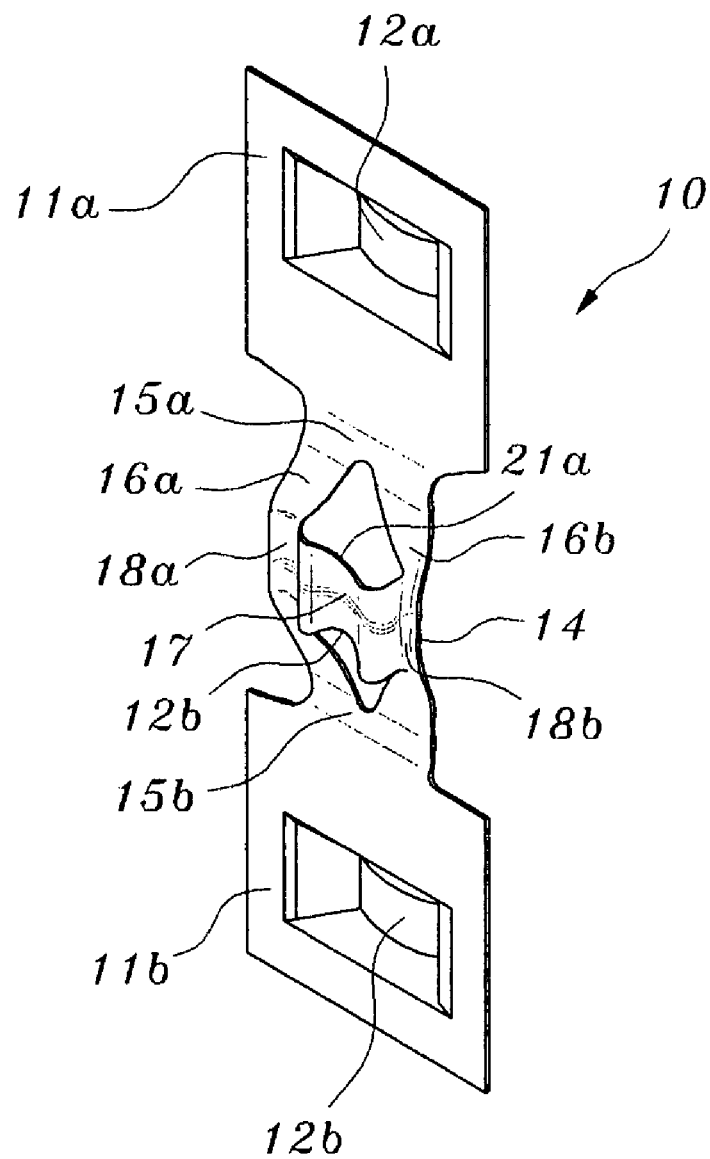
FIG. 6 is a perspective view illustrating a grid strap having a spacer grid spring that increases the conformal contact area with a nuclear fuel rod in accordance with an embodiment of the present invention.
Figure 7:
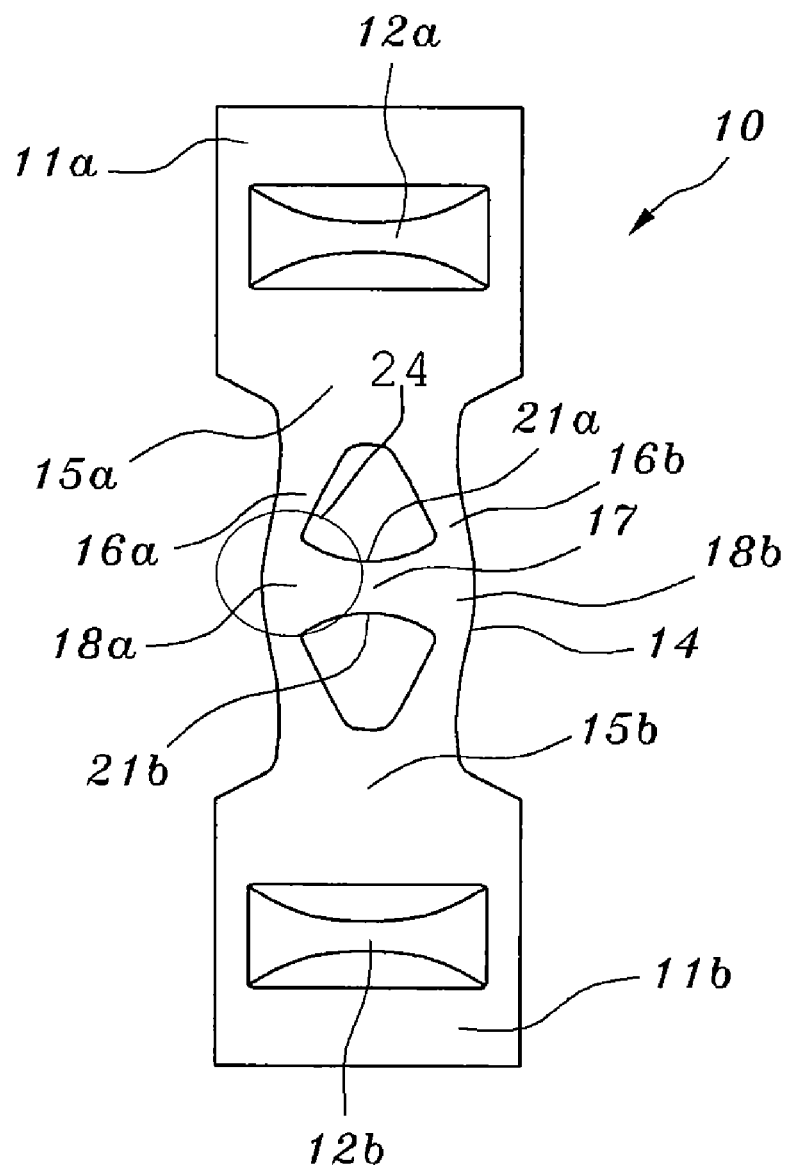
FIG. 7 is a front view illustrating a grid strap having a spacer grid spring that increases the conformal contact area with a nuclear fuel rod in accordance with an embodiment of the present invention.
Figure 8:
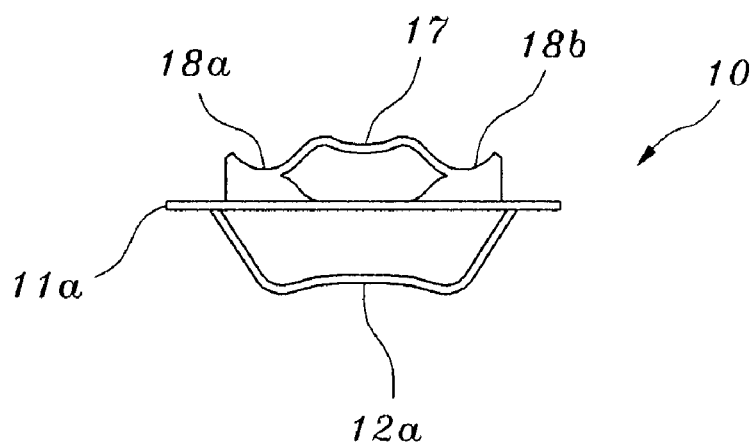
FIG. 8 is a plan view illustrating a grid strap having a spacer grid spring that increases the conformal contact area with a nuclear fuel rod in accordance with an embodiment of the present invention.
Figure 9:
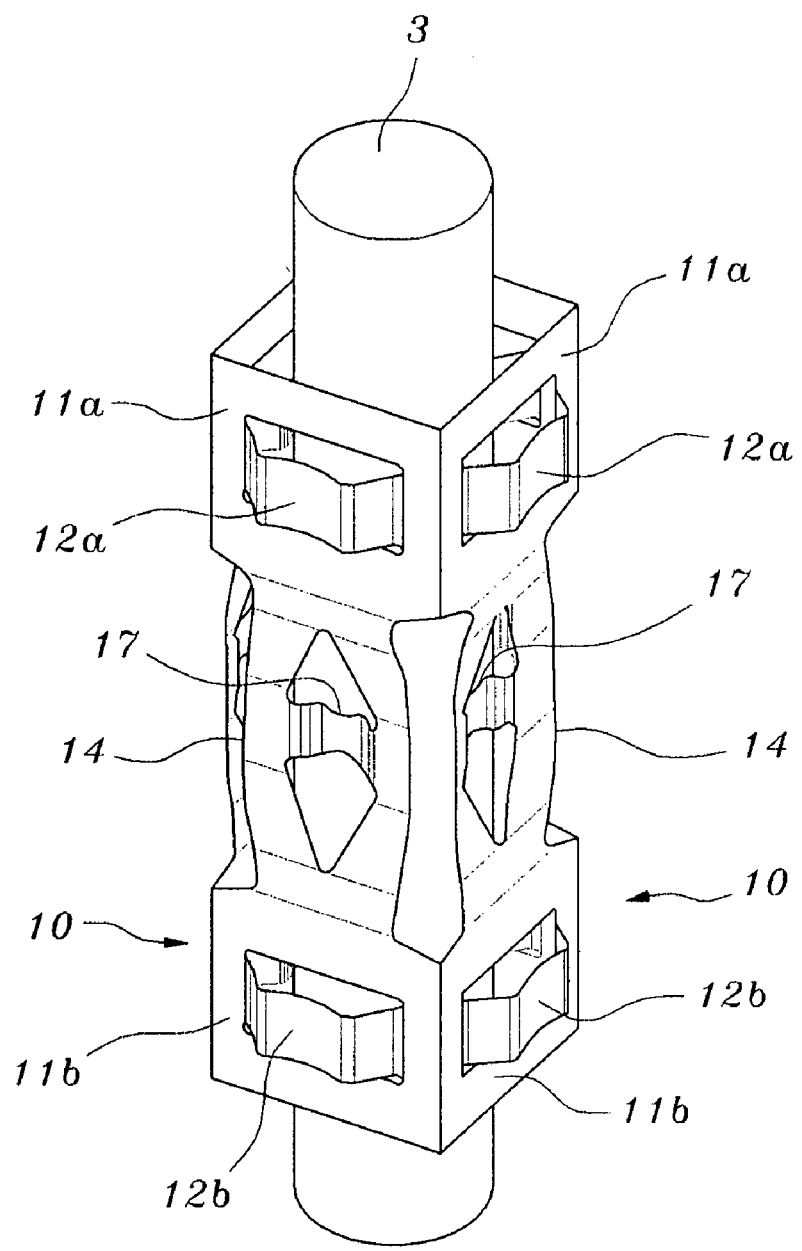
FIG. 9 is a perspective view schematically illustrating one cell of spacer grids made by using grid straps having a spacer grid spring that increases the conformal contact area with a nuclear fuel rod in accordance with an embodiment of the present invention.
Figure 10:
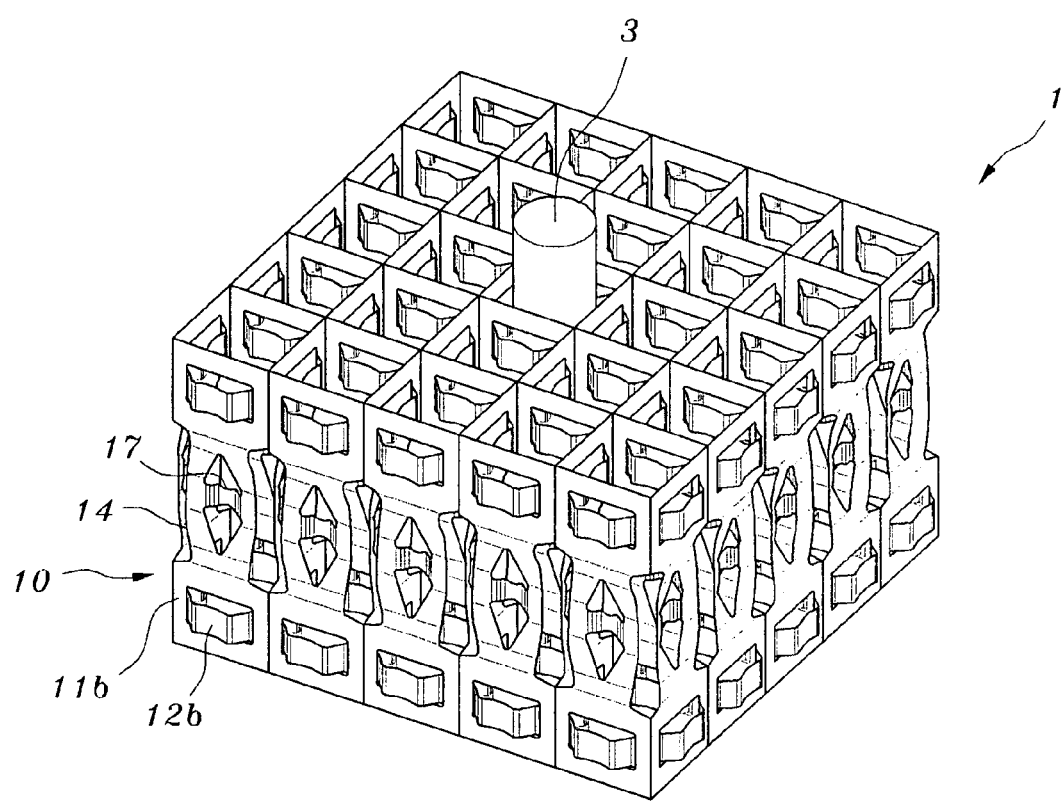
FIG. 10 is a perspective view schematically illustrating a spacer grid made by using grid straps having a spacer grid spring that increases the conformal contact area with a nuclear fuel rod in accordance with an embodiment of the present invention.

FIG. 6 is a perspective view illustrating a grid strap having a spacer grid spring that increases the conformal contact area with a nuclear fuel rod in accordance with an embodiment of the present invention. FIG. 7 is a front view illustrating a grid strap having a spacer grid spring that increases the conformal contact area with a nuclear fuel rod in accordance with an embodiment of the present invention. FIG. 8 is a plan view illustrating a grid strap having a spacer grid spring that increases the conformal contact area with a nuclear fuel rod in accordance with an embodiment of the present invention. FIG. 9 is a perspective view schematically illustrating one cell of spacer grids made by using grid straps having a spacer grid spring that increases the conformal contact area with a nuclear fuel rod in accordance with an embodiment of the present invention. FIG. 10 is a perspective view schematically illustrating a spacer grid made using grid straps having a spacer grid spring that increases the conformal contact area with a nuclear fuel rod in accordance with an embodiment of the present invention.

As illustrated in the figures, the spacer grid spring 14 that increases the conformal contact area with a fuel rod 3 is provided between upper and lower plates 11a and 11b which have the dimples 12a and 12b, respectively.

More specifically, the spacer grid spring 14 of the grid strap 10 of the present invention is provided between a lower end of the upper plate 11a and an upper end of the lower plate 11b, at the centers of which the dimples 12a and 12b protrude toward one side in place. Further, the spacer grid spring 14 connects the upper and lower plates 11a and 11b, and is in direct contact with the fuel rod 3.

The spacer grid spring 14 includes upper and lower bases 15a and 15b that vertically extend from the middle of the lower end of the upper plate 11a and the middle of the upper end of the lower plate 11b respectively, upper left-hand and right-hand supports 16a and 16b and lower left-hand and right-hand supports 16a and 16b that branch off from the upper and lower bases 15a and 15b respectively and are symmetrical with each other, bridges 18a and 18b that are connected between the upper and lower left-hand supports 16a and between the upper and lower right-hand supports 16b, and a conformal curvature 17 that is connected between the bridges 18a and 18b, protrudes in a direction opposite the dimples 12a and 12b, and is in direct contact with the fuel rod 3.

Here, the conformal curvature 17 of the spacer grid spring 14 is curved inwards to allow upper and lower ends 21a and 21b thereof to have a semi-circular form. In other words, the conformal curvature 17 is designed such that the middle portion and upper and lower ends 21a and 21b thereof contacting the fuel rod 3 are curved inwards in a circular or elliptical form so as to have the same radius of curvature at the same central point as the fuel rod 3 and to be in conformal contact with the fuel rod 3. Thereby, the conformal curvature 17 can expand the contact area with the fuel rod 3, uniformly maintain contact pressure distribution, and reduce the magnitude of peak stress.

Each of the bridges 18a and 18b located on opposite sides of the conformal curvature 17 is curved outwards in a semi-circular form, and is formed in a wedge shape 24 on one end thereof. In other words, each of the bridges 18a and 18b, which are located on opposite sides of the conformal curvature 17, has a semi-circular form curved outwards near the conformal curvature 17, and a wedge shape 24 on the end thereof.

As described above, the conformal curvature 17 is curved inwards to allow the upper and lower ends 21a and 21b thereof to have the semi-circular form, and the bridges 18a and 18b, which are located on the opposite sides of the conformal curvature 17, are curved outwards in the semi-circular form.

Meanwhile, even if pure bending deformation occurs when elastic deformation is caused by pressing the conformal curvature 17 contacting the fuel rod 3, the left-hand and right-hand supports 16a and 16b, which branch off from the upper and lower bases 15a and 15b extending from the centers of the lower and upper ends of the upper and lower plates 11a and 11b, minimize twisting deformation, so that the surface contact between the fuel rod 3 and the conformal curvature 17 can be maintained.

To this end, the left-hand and right-hand supports 16a and 16b are adapted to have relatively lower rigidity by bending compared to the rigidity of the conformal curvature 17, thereby being elastically deformed before the conformal curvature 17 is deformed by the load of the fuel rod 3 applied to the conformal curvature 17 of the spacer grid spring 14.

As illustrated in FIGS. 9 and 10, the grid strap 10 having the spacer grid spring 14 of the above-mentioned shape and form is designed so that both the conformal curvature 17 of the spacer grid spring 14 and the dimples 12a and 12b are in surface contact with the outer circumference of the fuel rod 3 when the fuel 3 is inserted into each cell of the spacer grids 1.

In this manner, the conformal curvature 17 of the spacer grid spring 14, which is in surface contact with the outer circumference of the fuel rod 3, and the bridges 18a and 18b of the spacer grid spring 14 are deformed in shape and form, thereby expanding the conformal contact area with the fuel rod 3. Thus, sliding of the conformal curvature 17 relative to the fuel rod 3 is reduced, so that the fuel rod 3 is reliably held, and the possibility of fretting wear occurring on the surface of the fuel rod 3 is reduced.

Further, the conformal curvature 17 of the spacer grid spring 14 is curved inwards to allow the upper and lower ends thereof to have the semi-circular form, thereby preventing a change in the curvature thereof. A change in the relatively minute amount of sliding between the fuel rod 3 and the conformal curvature 17 is minimized, thereby the fuel rod 3 can be stably supported regardless of changes in the supporting conditions of the fuel rod 3.

Figure 11:
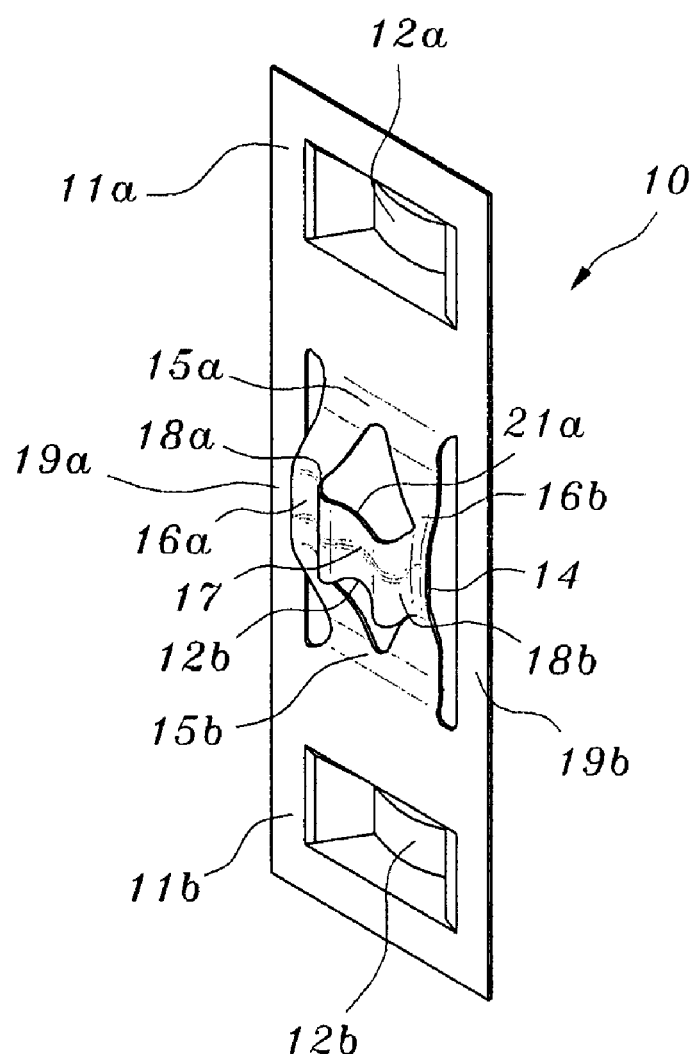
FIG. 11 is a perspective view illustrating a grid strap having a spacer grid spring that increases the conformal contact area with a nuclear fuel rod in accordance with another embodiment of the present invention.
Figure 12:
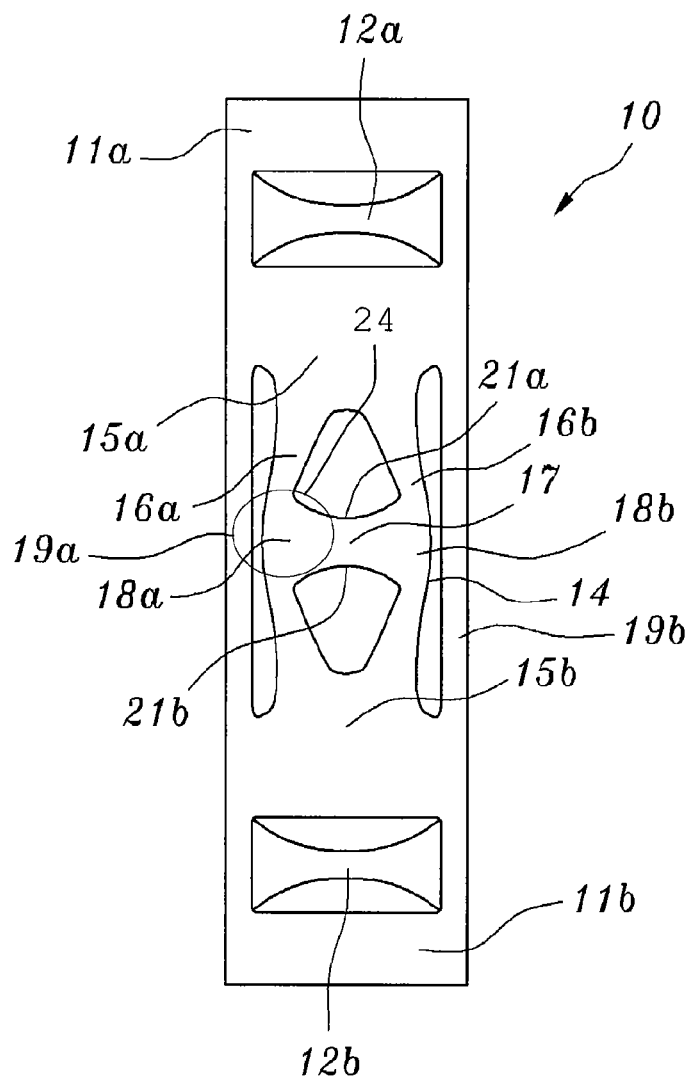
FIG. 12 is a front view illustrating a grid strap having a spacer grid spring in accordance with another embodiment of the present invention.
Figure 13:
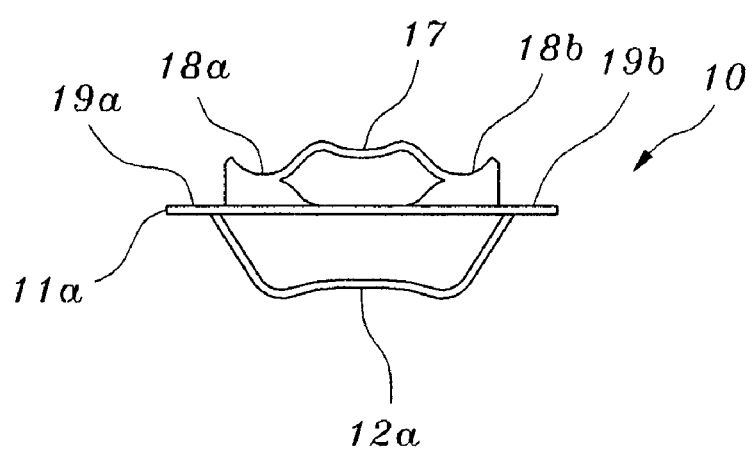
FIG. 13 is a plan view illustrating a grid strap having a spacer grid spring in accordance with another embodiment of the present invention.
Figure 14:
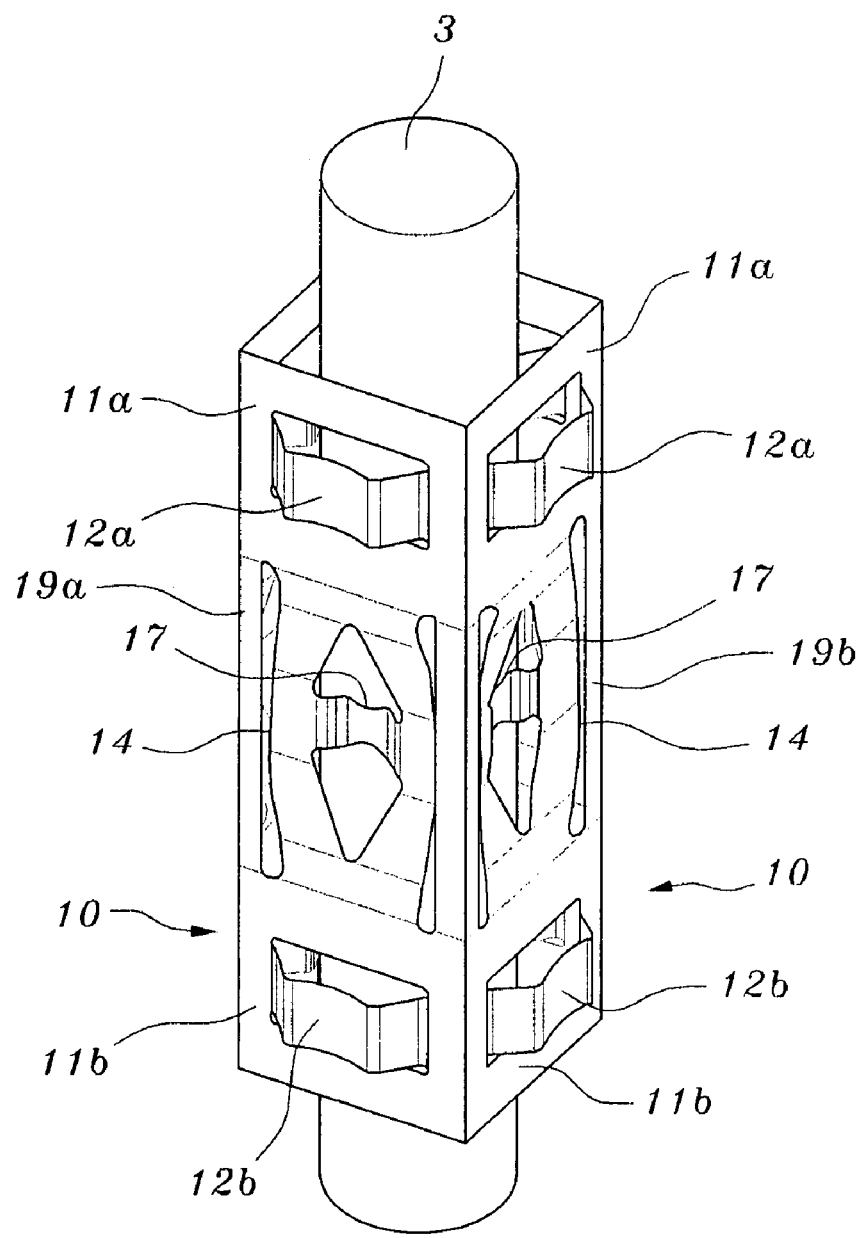
FIG. 14 is a perspective view schematically illustrating one cell of spacer grids made by using grid straps having a spacer grid spring in accordance with another embodiment of the present invention.
Figure 15:
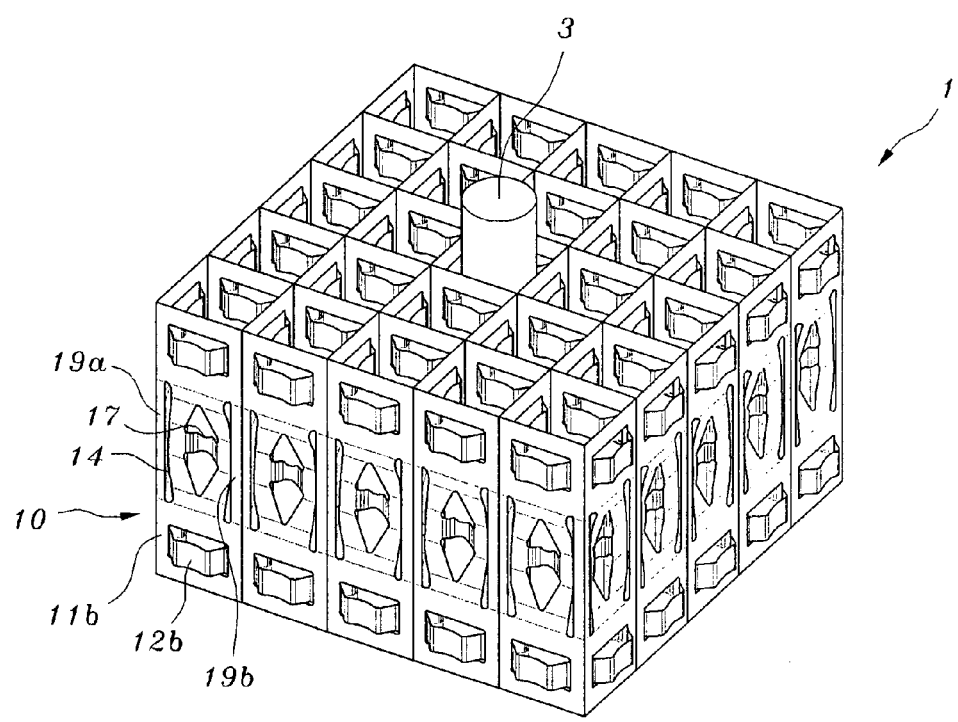
FIG. 15 is a perspective view schematically illustrating spacer grids made by using grid straps having a spacer grid spring in accordance with another embodiment of the present invention.

FIG. 11 is a perspective view illustrating a grid strap having a spacer grid spring that increases the conformal contact area with a nuclear fuel rod in accordance with another embodiment of the present invention. FIG. 12 is a front view illustrating a grid strap having a spacer grid spring in accordance with another embodiment of the present invention. FIG. 13 is a plan view illustrating a grid strap having a spacer grid spring in accordance with another embodiment of the present invention. FIG. 14 is a perspective view schematically illustrating one cell of spacer grids made using grid straps having a spacer grid spring in accordance with another embodiment of the present invention. FIG. 15 is a perspective view schematically illustrating spacer grids made by using grid straps having a spacer grid spring in accordance with another embodiment of the present invention. The spacer grid spring is partly changed in shape and form, compared to the previous embodiment.

As illustrated in the figures, the spacer grid spring 14, which increases the conformal contact area with a nuclear fuel rod in accordance with the present embodiment, includes connecting pieces 19a and 19b that connect upper and lower plates 11a and 11b at proper positions spaced apart from left- and right-hand supports 16a and 16b, which are provided on left- and right-hand sides of a conformal curvature 17, in outward directions by a predetermined distance.

More specifically, the connecting pieces 19a and 19b connect the upper and lower plates 11a and 11b at proper positions located outside the left- and right-hand supports 16a and 16b, which are connected with bridges 18a and 18b on opposite sides of the conformal curvature 17, and predetermined spaces are formed between the connecting pieces 19a and 19b and the left- and right-hand supports 16a and 16b.

As illustrated in FIGS. 14 and 15, the grid strap 10 having the spacer grid spring 14 of the above-mentioned shape and form is designed so that both the conformal curvature 17 of the spacer grid spring 14 and the dimples 12a and 12b are in surface contact with the outer circumference of the fuel rod 3 when the fuel rod 3 is inserted into a cell of the spacer grids 1, and so that the connecting pieces 19a and 19b are provided on the opposite sides of the conformal curvature 17 contacting the fuel rod 3. Thereby, the conformal curvature 17 contacting the fuel rod 3 is prevented from being changed in the curvature thereof. Further, a change in the relatively minute amount of sliding between the fuel rod 3 and the conformal curvature 17 is minimized, thereby the fuel rod 3 can be stably supported regardless of a change in the supporting conditions of the fuel rod 3.

As is apparent from the above description, according to the present invention, the spacer grid spring of the grid strap, which is in contact with the fuel rod, is optimized in shape, thereby the elasticity of the spacer grid spring contacting the fuel rod is increased, the conformal contact area with the contact portion of the spacer grid spring contacting the fuel rod when the fuel rod is inserted into each cell of the spacer grid spring is expanded to realize uniform stress distribution, and excessive plastic deformation of the spacer grid spring can be reduced. Further, the magnitude and distribution of the contact pressure between the fuel rod and the spacer grid spring are improved, thereby reducing the possibility of fretting wear caused by contact between the fuel rod and the spacer grid spring. The elastic behavior region of the spacer grid spring is expanded, so that the fuel rod can be stably supported until the lifetime of the fuel rod is expired despite changes in the supporting conditions of the fuel rod. In addition, the grid strap can inhibit breakdown caused by wear, fatigue, and vibration between a piping system transporting a fluid and its supporting structure and between elongate rods or pipes and supports for supporting them in the general industrial equipment using a boiler or heat exchanger, and thus can be applied to various fields.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A grid strap for a spacer grid, comprising:
an upper plate (11a) having a dimple (12a) protruding in one direction from one side of the upper plate (11a) and an upper base (15a) extending downwardly from a center of the upper plate (11a);
a pair of symmetrically opposed upper left-hand and upper right-hand supports (16a and 16b) branching off downwardly from the upper base (15a);
a lower plate (11b) having a dimple (12b) protruding in the one direction and a lower base (15b) extending upwardly from a center of the lower plate (11b);
a pair of symmetrically opposed lower left-hand and lower right-hand supports (16a and 16b) branching off upwardly from the lower base (15b);
a pair of symmetrically opposed bridges (18a and 18b) connected to the pair of symmetrically opposed upper left-hand and upper right-hand supports (16a and 16b) on one end of each bridge (18a and 18b) and the pair of symmetrically opposed lower left-hand and lower right-hand supports (16a and 16b) on an opposing end of each bridge (18a and 18b); and
a conformal curvature (17) extending from one bridge (18a) through a center region to the other bridge (18b), the conformal curvature (17) having top and bottom edges (21a and 21b) defining a distance therebetween,
wherein the center region is the midpoint between the bridges (18a and 18b) and the distance between the top and bottom edges (21a and 21b) being lesser at the midpoint than at the bridges (18a and 18b),
wherein the conformal curvature (17) is curved to be concave in the direction opposite to the one direction in which the dimples (12a and 12b) protrude,
wherein the upper and lower bases (15a and 15b), upper left-hand and right-hand supports (16a and 16b), lower left-hand and right-hand supports (16a and 16b), bridges (18a and 18b) and conformal curvature (17) combine to form a spacer grid spring (14) protruding in the direction opposite to the one direction in which the dimples (12a and 12b) protrude,
wherein all the area of the conformal curvature (17) including top and bottom edges (21a and 21b) are configured to contact a fuel rod (3),
wherein the bridges (18a and 18b) are curved to be concave in the direction opposite to the one direction in which the dimples (12a and 12b) protrude,
wherein each bridge (18a and 18b) is curved around a lateral axis of the grid strap and configured to be spaced from and parallel to a longitudinal axis of a fuel rod (3), and
wherein the top and bottom edges (21a and 21b) are curved to be tapered toward the center region.

2. The grid strap of claim 1, wherein each of the pair of symmetrically opposed upper left-hand and right-hand supports and each of the pair of symmetrically opposed lower lefthand and right-hand supports comprise a wedge-shape.

3. The grid strap of claim 1, wherein the rigidity of the left-hand supports and right-hand supports (16a and 16b) is lower than the rigidity of the conformal curvature (17).

* * * * *